United States Patent
Bermudez et al.

(10) Patent No.: US 9,643,713 B2
(45) Date of Patent: May 9, 2017

(54) STIFFENED PANEL AND METHOD OF MANUFACTURING SAME

(71) Applicant: AIRBUS GROUP SAS, Blagnac (FR)

(72) Inventors: Michel Bermudez, Suresnes (FR); Didier Mesnage, Saint Cloud (FR); Hichem Smaoui, Paris (FR); Benoit Fleury, Suresnes (FR)

(73) Assignee: AIRBUS GROUP SAS, Blagnac (FR)

( * ) Notice: Subject to any disclaimer, the term of this patent is extended or adjusted under 35 U.S.C. 154(b) by 64 days.

(21) Appl. No.: 14/426,955

(22) PCT Filed: Sep. 9, 2013

(86) PCT No.: PCT/FR2013/052069
§ 371 (c)(1),
(2) Date: Mar. 9, 2015

(87) PCT Pub. No.: WO2014/037678
PCT Pub. Date: Mar. 13, 2014

(65) Prior Publication Data
US 2015/0225073 A1    Aug. 13, 2015

(30) Foreign Application Priority Data
Sep. 10, 2012 (FR) ..................... 12 58480

(51) Int. Cl.
| H01G 9/155 | (2006.01) |
| B64C 7/00 | (2006.01) |
| B64D 41/00 | (2006.01) |
| B64C 1/12 | (2006.01) |
| B64C 1/40 | (2006.01) |
| H01G 11/58 | (2013.01) |

(Continued)

(52) U.S. Cl.
CPC ............... *B64C 7/00* (2013.01); *B64C 1/12* (2013.01); *B64C 1/40* (2013.01); *B64D 41/00* (2013.01); *H01G 11/58* (2013.01); *H01G 11/78* (2013.01); *B64C 2001/0072* (2013.01); *Y02T 50/433* (2013.01); *Y10T 29/435* (2015.01); *Y10T 29/49622* (2015.01)

(58) Field of Classification Search
USPC ....................................................... 361/502
See application file for complete search history.

(56) References Cited

U.S. PATENT DOCUMENTS

| 5,018,048 A * | 5/1991 | Shaw ................... B05D 1/60 |
| | | 29/25.42 |
| 5,050,035 A * | 9/1991 | Hegner ............... G01L 9/0075 |
| | | 29/25.42 |
| 5,793,603 A | 8/1998 | Lyman |

(Continued)

FOREIGN PATENT DOCUMENTS

FR    2898539 A1    9/2007

*Primary Examiner* — Eric Thomas
(74) *Attorney, Agent, or Firm* — Im IP Law; C. Andrew Im

(57) ABSTRACT

A method of manufacturing a stiffened panel having a skin and at least one substantially elongate stiffener having a longitudinal groove forming a cavity. At least one storage device for storing and releasing electrical energy. The longitudinal groove is filled with at least one storage device for storing and releasing electrical energy. The storage device is covered with a skin which forms the cavity together with the longitudinal groove of the stiffener. A stiffened ring can be derived from the method.

18 Claims, 1 Drawing Sheet

(51) Int. Cl.
*H01G 11/78* (2013.01)
*B64C 1/00* (2006.01)

(56) References Cited

U.S. PATENT DOCUMENTS

| | | | | |
|---|---|---|---|---|
| 7,864,505 B1* | 1/2011 | O'Brien | ............... | H01G 4/203 |
| | | | | 361/303 |
| 8,576,542 B2* | 11/2013 | Snyder | ............... | H01G 11/02 |
| | | | | 361/523 |
| 9,315,213 B2* | 4/2016 | Raymond | ............... | B62D 25/02 |
| 9,359,061 B2* | 6/2016 | Kismarton | ............... | B29C 70/44 |
| 2003/0169558 A1* | 9/2003 | Olson | ............... | H01G 9/155 |
| | | | | 361/502 |
| 2009/0309264 A1 | 12/2009 | Cavaliere | | |
| 2011/0164349 A1* | 7/2011 | Snyder | ............... | H01G 11/02 |
| | | | | 361/525 |

* cited by examiner

STIFFENED PANEL AND METHOD OF MANUFACTURING SAME

RELATED APPLICATIONS

This application is a §371 application from PCT/FR2013/052069 filed Sep. 9, 2013, which claims priority from French Patent Application No. 12 58480 filed Sep. 10, 2012, each of which is herein incorporated by reference in its entirety.

TECHNICAL FIELD OF THE INVENTION

This invention relates to a stiffened panel. The invention finds its application in the aeronautical domain.

BACKGROUND OF THE INVENTION

The evolution of aircraft towards an increased use of electrical consumers has considerably increased the need for electrical energy and power. In order to satisfy these new needs, systems have notably been developed in which the necessary electrical energy is stored on board the aircraft before take-off. From this perspective, packs of ultracapacitors, for example, have been introduced. Such packs are described, for example, in the document U.S. Pat. No. 5,793,603.

However, it is necessary, with such systems, to optimize the energy and power density in order to reduce their mass and volume, so as to allow the mass of aircraft to be lightened and hence their environmental impact to be reduced.

A need to reduce the mass and volume of such systems therefore exists, while improving the energy and power density supplied by said systems.

One aspect of this invention allows this first technical problem to be resolved.

It is traditional for a stiffened panel to comprise a skin and at least one substantially elongated stiffener, including a groove placed in the longitudinal direction and forming a cavity with the skin. Such a stiffened panel is generally manufactured by draping over a tooling core whose shape is complementary with the cavity, and which is withdrawn once manufacturing is finished. The operation for withdrawing the tooling core is described, for example, in the Applicant's document FR2898539.

However, withdrawal of the tooling core is particularly difficult, notably when the stiffener has a double curvature. In fact, such an operation necessitates much time and means.

A need therefore exists to simplify the manufacturing method of such a stiffened panel, notably the operation of withdrawal from the tooling core, so as to reduce its time and cost.

One aspect of this invention allows this second technical problem to be resolved.

OBJECT AND SUMMARY OF THE INVENTION

More precisely, an object of this invention is a method of manufacturing a stiffened panel comprising a skin and at least one substantially elongated stiffener, said at least one stiffener comprising a groove placed in the longitudinal direction and forming a cavity with the skin, said panel comprising at least one means for storing and releasing electrical energy, which means is placed inside the cavity, said method involving a step of filling the groove of the at least one stiffener with at least one means of storing and releasing electrical energy; and a step of covering the at least one means of storing and releasing electrical energy with the skin, so that the groove of the stiffener and the skin together form the cavity.

The use of such a stiffened panel has the advantage of allowing on one hand a mass gain by economizing the mass that would have been necessary to encapsulate the at least one means of storing and releasing electrical energy, and on the other, a volume gain by using the hitherto unused volume of the cavity of the stiffened panel.

Furthermore, such a stiffened panel has the advantage of being able to be placed as near as possible to the system to be supplied with electrical energy.

Finally, the presence of the at least one means of storing and releasing electrical energy in the stiffener cavity has the advantage of modifying the acoustic response of the structure. It is therefore possible to avoid using noise attenuation devices, thereby allowing a supplementary mass gain.

Preferably, the at least one means of storing and releasing electrical energy forms a core over which the skin is draped, during the covering step of the at least one means of storing and releasing electrical energy.

Such a method has the advantage of using at least one means of storing and releasing electrical energy as a tooling core, which it is not necessary to withdraw once manufacturing of the stiffened panel is finished.

More preferably, the stiffener comprises a composite material; the step of filling the stiffener groove is performed with a pre-cured stiffener; and the draping step is followed by a curing step of the stiffened panel.

According to one embodiment of the invention, the step of filling the stiffener groove is performed by successive layering of an electrode layer and a layer of the porous electric insulating means substantially parallel to the surface of the skin forming the cavity with the groove of the at least one stiffener.

According to another embodiment of the invention, the method comprises, before the step of filling the stiffener groove, a step of successive layering of an electrode layer and a layer of the porous electric insulating means, then a step of winding the layering achieved around a core having a form substantially complementary with the cavity.

Preferably, the method furthermore comprises a step in which the electrode layers are provided with means for collecting the electrical energy; a step in which the means for collecting the electrical energy of a same pole are connected together to a hollow tube comprising an opening opposite the at least one means of storing and releasing electrical energy; a step in which the electrolyte is injected into said tube so as to impregnate the electrode layers; and a step in which the tube is plugged.

The installation of such a hollow tube has the advantage of avoiding the presence of an inner capsule directly in the structure of the stiffener, thereby allowing a gain in simplicity and mechanical strength of said stiffener.

Another object of the invention is a stiffened panel comprising a skin and at least one substantially elongated stiffener, said at least one stiffener comprising a groove placed in the longitudinal direction and forming a cavity with the skin, said panel comprising at least one means for storing and releasing electrical energy, which means is placed inside the cavity, said stiffened panel being derived from a method such as described above.

Preferably, the at least one means of storing and releasing electrical energy is placed inside the cavity so as to mold to the walls of said cavity.

Such a means of storing and releasing electrical energy has the advantage of forming a core facilitating the manufacture of the stiffened panel.

Preferably, the at least one means of storing and releasing electrical energy is an ultracapacitor.

The use of an ultracapacitor has the advantage of allowing, for equal mass, an intermediate quantity of energy to be stored between a battery and a capacitor for a faster release of energy than a battery.

According to an embodiment of the invention, the ultracapacitor comprises two electrode layers placed substantially parallel to a surface of the skin, said layers being separated one from the other by a layer of a porous electrical insulation means.

Preferably, the layers of the ultracapacitor are provided, at two opposite extremities in the transverse direction, with a means of sealing between the electrode layers, so that an electrolyte with which the electrode layers are impregnated can only flow through the layer of the porous electrical insulation means.

The use of such a sealing means has the advantage of forcing the electrolyte to flow through the layer of porous electrical insulation means and thus to allow better functioning of the ultracapacitor.

Preferably, two consecutive electrode layers are provided with means for collecting the electrical energy, said means being placed opposite each other in the transverse direction.

Such an arrangement of the means for collecting the electrical energy has the advantage of simplifying the connection of the same pole means.

According to another embodiment of the invention, the ultracapacitor comprises two electrode layers substantially placed in a spiral, said layers being separated one from the other by a layer of a porous electrical insulation means.

Preferably, two consecutive electrode layers protrude, one relative to the other, in the longitudinal direction, said protrusions being provided with means for collecting the electrical energy.

Such an arrangement of the electrode layers has the advantage of simplifying the connection of the means for collecting the same pole electrical energy.

BRIEF DESCRIPTION OF THE DRAWINGS

The invention will be better understood on reading the description that follows and on examining the accompanying figures. These are given by way of example and are in no way limitative for the invention. The figures show.

DETAILED DESCRIPTION OF THE EMBODIMENTS

Figure 1:
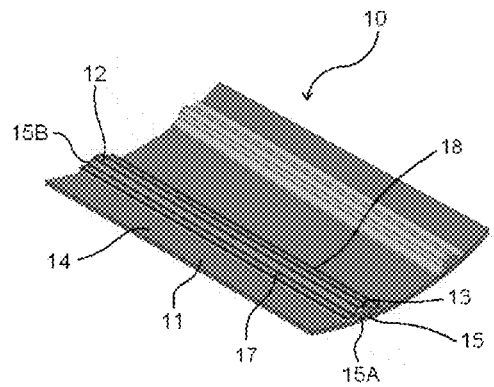
FIG. 1: a general view of a stiffened panel according to an embodiment of the invention.
Figure 2A:
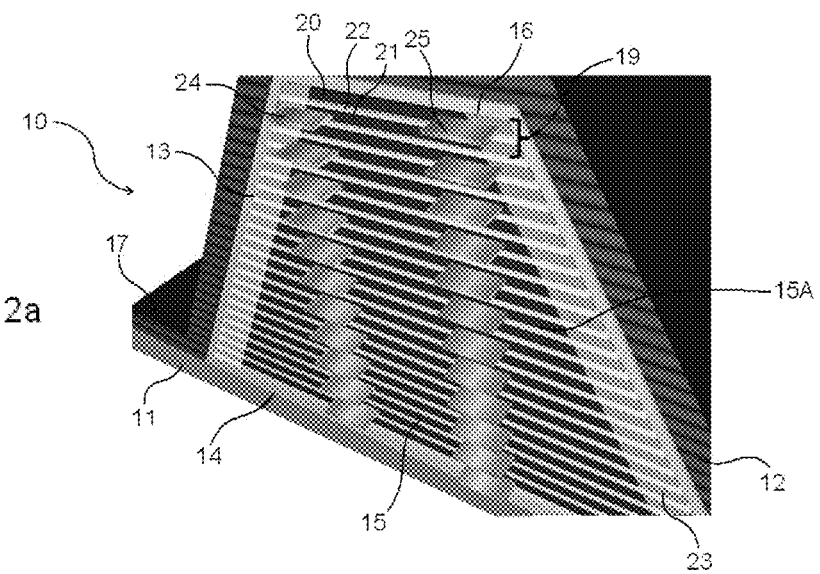
FIGS. 2a and 2b: detailed views of the stiffened panel according to the embodiment of the invention shown in FIG. 1.
Figure 2B:
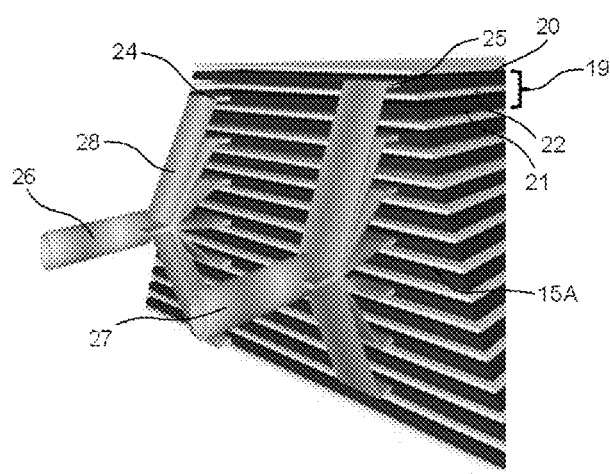

FIGS. 1, 2a and 2b respectively show a general view and detailed views of a panel 10 stiffened according to an embodiment of the invention.

The stiffened panel 10 comprises a skin 11. The skin 11 is, for example, the fuselage of an airborne vehicle, such as an aircraft. The skin 11 can be substantially flat, with a single curvature or a double curvature. The skin 11 in the example has a single curvature.

The stiffened panel 10 furthermore comprises at least one stiffener 12. The stiffener 12 comprises, for example, a composite material. The stiffener 12 has a form substantially elongated along a first direction. The first direction corresponds in the next part of the description to a direction called longitudinal.

The stiffener 12 comprises a groove 13 placed in the longitudinal direction. A surface 14 of the skin 11 covers the groove 13 of the stiffener 12. The assembly of the skin 11 and of the groove 13 thus forms a cavity 15. The groove 13 preferably comprises a base 16 placed substantially parallel to the surface 14 of the skin 11.

Preferably, the cavity 15 is closed at each extremity (15A, 15B) in the longitudinal direction. A first extremity 15A of the cavity 15 is shown in FIGS. 2a and 2b.

Preferably, the stiffener 12 comprises ribs (17, 18), at each extremity of the groove 13, in a direction called transverse. The ribs (17, 18) are configured so that they mold to the surface 14 of the skin 11. By this method, the skin 11 and the stiffener 12 adhere one to the other at the ribs (17, 18).

The cavity 15 accommodates at least one means 19 of storing and releasing electrical energy. A volume occupied by the at least one means 19 of storing and releasing electrical energy in the cavity 15 is substantially equal to an internal volume of the cavity 15. By this method, the at least one means 19 of storing and releasing electrical energy molds to the walls of the cavity 15.

Preferably, the at least one means 19 of storing and releasing electrical energy is an ultracapacitor. The ultracapacitor 19 comprises two electrode layers (20, 21), separated one from the other by a layer 22 of a porous electrical insulation means. The electrode layers (20, 21) are, for example, sheets of aluminum covered with a deposit of active charcoal, and the layer 22 of the porous electrical insulation means is, for example, in cellulose. The electrode layers (20, 21) are impregnated with an electrolyte, preferably liquid, such as, for example, propylene carbonate or acetonitrile.

In the example shown in FIGS. 2a and 2b, the cavity 15 accommodates several ultracapacitors 19. The ultracapacitors 19 are placed relative to each other so that an electrode layer (20, 21) simultaneously serves two ultracapacitors.

According to the embodiment of the invention shown in FIGS. 2a and 2b, the layers (20, 21, 22) of electrodes and porous electrical insulation means are placed substantially parallel to the surface 14 of the skin 11.

Preferably, the extremities of the layers (20, 21, 22) of electrodes and porous electrical insulation means along the transverse direction are provided with a means 23 for sealing between said layers, so that the electrolyte can only flow through the layer 22 of the porous electrical insulation means. The sealing means 23 is, for example, adhesive as a film or liquid resin.

According to another embodiment of the invention, the layers (20, 21, 22) of electrodes and porous electrical insulation means are substantially placed in a spiral. The spiral is preferably of a form substantially complementary with the cavity 15. The layers (20, 21, 22) of electrodes and porous electrical insulation means are, for example, placed in a spiral around a core of a form substantially complementary with the cavity 15.

According to the embodiment shown in FIGS. 2a and 2b, the electrode layers (20, 21) are provided, at the first extremity 15A with means (24, 25) for collecting the electrical energy, for example, in the form of tongue-like strips. The means (24, 25) for collecting the electrical energy from two consecutive electrode layers (20, 21) are preferably placed opposite one another in the transverse direction. By this method, the means (24, 25) for collecting the same pole electrical energy are placed at a same extremity in the transverse direction.

According to a variant, the first of two consecutive electrode layers is provided, at the first or at the second extremity (15A, 15B), with a means for collecting the electrical energy, and the second is provided, at the second or at the first extremity (15B, 15A), with another means for collecting the electrical energy. By this method, the means (24, 25) for collecting the same pole electrical energy are placed at a same extremity (15A, 15B) in the longitudinal direction. Two consecutive electrode layers preferably protrude, one relative to the other in the longitudinal direction, and the means for collecting the electrical energy from the electrode layers are placed on said protrusions.

Preferably, the means for collecting the same pole electrical energy are substantially aligned with each other.

The means for collecting the same pole electrical energy are each connected to a tube (26, 27) by means of a branch 28. At least one of these tubes (26, 27) is preferably hollow and comprises an opening placed opposite the ultracapacitors 19. By this method, the electrolyte can be introduced into the at least one of the tubes (26, 27), so as to come to impregnate the electrode layers (20, 21). In the example, each of the tubes (26, 27) is hollow and comprises an opening placed opposite the ultracapacitors 19.

The stiffened panel 10 allows a mass gain by economizing the mass that would have been necessary to encapsulate the ultracapacitors 19, together with a volume gain by using the hitherto unoccupied volume of the cavity 15 of the stiffened panel 10. The stiffened panel 10 furthermore has the advantage of being able to be placed as near as possible to the system to be supplied with electrical energy, notably at places with difficult access such as the nose of an aircraft.

The stiffened panel 10 as described above is manufactured by means of a mold having a surface substantially complementary with the surface 14 of the skin 11 and at least one groove substantially complementary with the groove 13 of the stiffener 12.

The stiffener 12 is placed in a first time in the at least one groove of the mold. The stiffener 12 is preferably pre-cured when said stiffener is placed in the mold.

The groove 13 of the stiffener 12 is then filled with ultracapacitors 19 by successive layering of an electrode layer 20 and of a layer 22 of the porous electrical insulation means, substantially parallel to the base 16 of the groove 13. The groove 13 is considered "filled" when a layer of the ultracapacitors 19 is level with the surface of the mold.

In a variant, filling the groove 13 of the stiffener 12 necessitates a first step of successive layering of an electrode layer and a layer of porous electrical insulating means, then a second step of winding the layering previously formed around a core having a form substantially complementary with the walls of the groove 13 and the surface of the mold, and finally, a third step of putting the layers thus wound in place in the groove 13 of the stiffener 12.

In the example, the sealing means 23 is then applied to the extremities of the layers (20, 21, 22) of electrodes and porous electrical insulating means in the transverse direction, at the interface between the groove 13 of the stiffener 12 and said layers. This embodiment is particularly suitable when the sealing means 23 is liquid resin. In a variant, the sealing means 23 is applied to the extremities of each of the layers (20, 21, 22) of electrodes and porous electrical insulating means in the transverse direction before layering said layer. This embodiment is particularly suitable when the sealing means 23 is adhesive as a film.

Then, the means (24, 25) for collecting electrical energy are placed on each of the electrode layers, and the same pole means (24, 25) are each connected to a tube (26, 27), preferably by crimping.

The ultracapacitors 19 are then covered with the skin 11, so that the groove 13 of the stiffener 12 and the skin 11 together form the orifice 15. The skin 11 is preferably draped over the ultracapacitors 19 forming a core, and the stiffened panel 10 formed thereby is cured in an autoclave.

In the example shown in FIGS. 2a and 2b, the electrolyte is then injected into each of the tubes (26, 27) so as to come to impregnate the electrode layers (20, 21), then the tubes (26, 27) are plugged, for example by crimping or by brazing. In a variant, the electrolyte is injected into only one of the tubes, the other of said tubes having been previously plugged.

The method of manufacturing the stiffened panel 10 allows the ultracapacitors 19 to be used as a tooling core for draping the skin 11, without it being necessary to withdraw them once said manufacturing is finished.

The invention claimed is:

1. A method of manufacturing a stiffened panel comprising a skin and at least one substantially elongated stiffener, said at least one stiffener comprising a groove placed in the longitudinal direction and forming a cavity with the skin, the stiffened panel comprising at least one storage device for storing and releasing electrical energy, the method comprising the steps of:

successive layering of an electrode layer and a layer of a porous electric insulator;

winding the successive layering around a core having a form substantially complementary to the cavity;

filling the groove of said at least one stiffener with said at least one storage device; and covering said at least one storage device with the skin, so that the groove of said at least one stiffener and the skin together form the cavity housing said at least one storage device.

2. The method as claimed in claim 1, wherein said at least one storage device forms a core; and further comprising the step of draping the skin over the core.

3. The method as claimed in claim 2, wherein said at least one stiffener comprises a composite material; and wherein the step of filling the groove of said at least one stiffener is performed with a pre-cured stiffener; and further comprising the step of curing a pre-cured stiffened panel.

4. The method as claimed in claim 1, wherein the electrode layer and the layer of the porous electric insulator are successively layered substantially parallel to a surface of the skin forming the cavity with the groove of said at least one stiffener.

5. The method as claimed in claim 1, further comprising the steps of providing each electrode layers with a collector to collect electrical energy; connecting the collectors of a same pole to a hollow tube comprising an opening opposite said at least one storage device; injecting an electrolyte into the hollow tube to impregnate the electrode layers; and plugging the hollow tube.

6. A stiffened panel comprising a skin and at least one substantially elongated stiffener, said at least one stiffener comprising a groove placed in the longitudinal direction and forming a cavity with the skin, the stiffened panel comprising at least one storage device for storing and releasing electrical energy, said at least one storage device being placed inside the cavity; the groove of said at least one stiffener is filled with successive layers of an electrode layer and a layer of porous electric insulator, the successive layers being wound around a core having a form substantially complementary to the cavity; and wherein the skin covers said at least one storage device so that the groove of said at least one stiffener and the skin together form the cavity housing said at least one storage device.

7. The stiffened panel as claimed in claim 6, wherein said at least one storage device is placed inside the cavity so as to mold to walls of the cavity.

8. The stiffened panel as claimed in claim 6, wherein said at least one storage device is an ultracapacitor.

9. The stiffened panel as claimed in claim 8, wherein the ultracapacitor comprises two electrode layers placed substantially parallel to a surface of the skin and a layer of a porous electrical insulator between the two electrode layers.

10. The stiffened panel as claimed in claim 9, wherein the two electrode layers of the ultracapacitor are impregnated with an electrolyte and provided at two opposite extremities in a transverse direction and sealed with a sealer so that the electrolyte flows only through the layer of the porous electrical insulator.

11. The stiffened panel as claimed in claim 9, wherein each electrode layer is provided with a collector to collect the electrical energy, the collectors being placed opposite each other in a transverse direction.

12. The stiffened panel as claimed in claim 9, wherein two electrode layers protrude, one relative to the other, in a longitudinal direction to provide protrusions comprising a collector to collect the electrical energy.

13. The stiffened panel as claimed in claim 8, wherein the ultracapacitor comprises two electrode layers substantially placed in a spiral; and a layer of a porous electrical insulator between the two electrode layers.

14. A method of manufacturing a stiffened panel comprising a skin and at least one substantially elongated stiffener, said at least one stiffener comprising a groove placed in the longitudinal direction and forming a cavity with the skin, the stiffened panel comprising at least one storage device for storing and releasing electrical energy, the method comprising the steps of:
  successive layering of an electrode layer and a layer of a porous electric insulator;
  providing each electrode layers with a collector to collect electrical energy;
  connecting the collectors of a same pole to a hollow tube comprising an opening opposite said at least one storage device;
  injecting an electrolyte into the hollow tube to impregnate the electrode layers;
  plugging the hollow tube;
  filling the groove of said at least one stiffener with at least one storage device; and
  covering said at least one storage device with the skin, so that the groove of said at least one stiffener and the skin together form the cavity housing said at least one storage device.

15. The method as claimed in claim 14, wherein said at least one storage device forms a core; and further comprising the step of draping the skin over the core.

16. The method as claimed in claim 15, wherein said at least one stiffener comprises a composite material; and wherein the step of filling the groove of said at least one stiffener is performed with a pre-cured stiffener; and further comprising the step of curing a pre-cured stiffened panel.

17. The method as claimed in claim 14, wherein the electrode layer and the layer of the porous electric insulator are successively layered substantially parallel to a surface of the skin forming the cavity with the groove of said at least one stiffener.

18. The method as claimed in claim 14, further comprising the step of winding the successive layering around a core having a form substantially complementary to the cavity.

* * * * *